US009548012B1

(12) United States Patent
Sjoberg et al.

(10) Patent No.: US 9,548,012 B1
(45) Date of Patent: Jan. 17, 2017

(54) ADAPTIVE ERGONOMIC KEYBOARD

(75) Inventors: Robert W. Sjoberg, San Francisco, CA (US); Christopher D. Coley, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 45 days.

(21) Appl. No.: 13/597,932

(22) Filed: Aug. 29, 2012

(51) Int. Cl.
*G06F 3/0488* (2013.01)
*G09G 3/00* (2006.01)

(52) U.S. Cl.
CPC ........... *G09G 3/002* (2013.01); *G06F 3/04886* (2013.01)

(58) Field of Classification Search
USPC ........................................................ 715/773
See application file for complete search history.

(56) References Cited

U.S. PATENT DOCUMENTS

| 6,611,252 | B1* | 8/2003 | DuFaux ........................ 345/168 |
| 6,654,733 | B1* | 11/2003 | Goodman et al. .............. 706/52 |
| 8,212,768 | B2* | 7/2012 | Fein et al. .................... 345/156 |
| 8,334,837 | B2* | 12/2012 | Radivojevic et al. ........ 345/156 |
| 8,345,008 | B2* | 1/2013 | Lee et al. ...................... 345/168 |
| 8,508,481 | B1* | 8/2013 | Landry ........................... 345/168 |
| 8,576,173 | B2* | 11/2013 | Verhaegh ...................... 345/168 |
| 8,947,349 | B1* | 2/2015 | Hart ........................ G09G 3/002 345/156 |
| 2003/0165048 | A1* | 9/2003 | Bamji ................... G06F 1/1626 361/679.21 |
| 2004/0064597 | A1* | 4/2004 | Trewin ............................. 710/8 |
| 2006/0101349 | A1* | 5/2006 | Lieberman et al. .......... 715/773 |
| 2007/0013716 | A1* | 1/2007 | Kjeldsen ................... H04N 5/74 345/594 |
| 2008/0082934 | A1* | 4/2008 | Kocienda et al. ............ 715/773 |
| 2008/0169944 | A1* | 7/2008 | Howarth et al. ................ 341/23 |
| 2009/0189864 | A1* | 7/2009 | Walker et al. ................ 345/169 |
| 2009/0322688 | A1* | 12/2009 | Ording et al. ................ 345/173 |
| 2010/0037180 | A1* | 2/2010 | Elias et al. .................... 715/840 |
| 2010/0259561 | A1* | 10/2010 | Forutanpour et al. ........ 345/660 |
| 2011/0074685 | A1* | 3/2011 | Causey et al. ................ 345/168 |
| 2011/0074692 | A1* | 3/2011 | Causey et al. ................ 345/169 |
| 2011/0078613 | A1* | 3/2011 | Bangalore .................... 715/773 |

(Continued)

FOREIGN PATENT DOCUMENTS

WO     WO2011088053     7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

*Primary Examiner* — Jennifer To
*Assistant Examiner* — Beau Spratt
(74) *Attorney, Agent, or Firm* — Lee & Hayes, PLLC

(57) ABSTRACT

Techniques are described for adapting a keyboard arrangement to be personalized for a user, based on detected gestures made by the user while employing the keyboard arrangement. An adaptable keyboard arrangement may be provided for the user as part of a device, projected onto a surface near the user, or rendered abstractly into a space near the user. Sensor and/or contextual data may be employed to identify mistypes or near-mistypes of the user, and a statistical model may be developed of the user's typing habits. Keyboard modifications may be determined that adapt the keyboard to minimize potential typing errors and/or provide a more ergonomic keyboard arrangement for the user.

27 Claims, 10 Drawing Sheets

(56) References Cited

U.S. PATENT DOCUMENTS

| | | | |
|---|---|---|---|
| 2011/0179372 A1* | 7/2011 | Moore et al. | 715/773 |
| 2011/0216007 A1* | 9/2011 | Cheng et al. | 345/168 |
| 2012/0131490 A1* | 5/2012 | Lin et al. | 715/773 |
| 2012/0223885 A1 | 9/2012 | Perez | |
| 2012/0274745 A1* | 11/2012 | Russell | H04N 13/025 348/46 |
| 2012/0311476 A1* | 12/2012 | Campbell | 715/773 |
| 2013/0019191 A1* | 1/2013 | Arnold | 715/765 |
| 2013/0125037 A1* | 5/2013 | Pasquero et al. | 715/773 |
| 2013/0167064 A1* | 6/2013 | Amsterdam et al. | 715/773 |
| 2013/0257732 A1* | 10/2013 | Duffield | 345/168 |

* cited by examiner

ADAPTIVE ERGONOMIC KEYBOARD

BACKGROUND

Information entry is an important part of the user experience for a person using a computing device. Although recent decades have seen the development of technologies that provide new ways for users to enter information, such as the mouse, trackpad, gestural recognition, and voice recognition, the keyboard remains the predominant method used for information entry by users. The common "QWERTY" keyboard layout was developed for use in mechanical typewriters in the 1860s and 1870s and is, in many ways, ill-suited for data entry in modern computing devices, particularly those devices with smaller form factors such as smartphones and tablets. Moreover, although some efforts have been made to improve on this layout, such as the Dvorak Simplified Keyboard developed in the 1930s or various keyboard configurations designed to be more ergonomic, the keyboards in use today remain inflexible data entry devices that may not be suitable for all users.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1A:
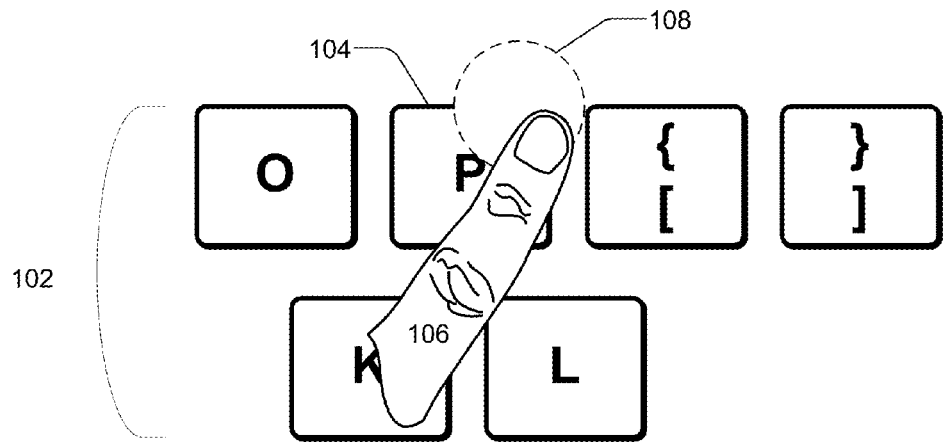
FIGS. 1A, 1B, and 1C depict example keyboard arrangements, in accordance with embodiments.

Embodiments are described for modifying a keyboard arrangement based on detected user gestures and/or an active application, and providing the modified keyboard arrangement for use by a user. In some embodiments, a keyboard arrangement is presented to a user and one or more sensors monitor the user's gestures while using the keyboard arrangement to input information to a computing device. The sensor data may be analyzed to identify gestures and/or combinations of gestures that indicate a mistype (e.g., the user attempting to type one key but typing another instead). In some embodiments, a mistype may be detected based on subsequent gesture(s) by the user, such as the user typing the backspace or delete key following another key or sequence of keys. In some embodiments, a mistype may be detected based on a grammar and/or syntax check by the computing system, such as detection of a misspelled word. Moreover, in some embodiments the sensor data may indicate that the user selected a key in a location that was off-center on the key.

The collected sensor data may be analyzed to develop usage model (e.g., a statistical usage model) of the user's typing habits, including which keys the user is more likely to mistype or nearly mistype (e.g., by hitting the key off-center) and a statistical likelihood that mistypes and/or near mistypes may occur. Based on the statistical model, embodiments may modify the keyboard arrangement to minimize potential errors in information input by the user. Moreover, in some embodiments, modification of the keyboard arrangement may provide a more ergonomic keyboard arrangement for the user. For example, sensors may detect that the user places his/her hands in a particular configuration when typing, and the keyboard modification may include changing a location of one or more portions of the keyboard to allow the user to position his/her hands more comfortably, for more efficient information entry, to reduce the effort of typing, and/or to avoid potential health problems associated with a previous, non-ergonomic position.

Because the keyboard modifications may be based on detected gestures of a particular user, embodiments provide for a personalization of a keyboard arrangement for the particular user. For example, keyboard modifications may be performed dynamically and provided to the user during a same session as the detected gestures. As a further example, keyboard modification may be performed based on analysis of gestural data collected during a first session, and a modified keyboard may be provided to the user during a subsequent session. Keyboard modification data associated with the user may be stored in data storage, to enable the personalized keyboard to be provided to the user when the user initiates a session with a computing device (e.g., when the user logs in or is otherwise identified and/or authenticated by the device). Keyboard modification data may be stored locally on the computing device, in a remote storage location (e.g., on a server or database associated with a cloud computing service), or in any combination of local and remote storage location(s).

Figure 1B:
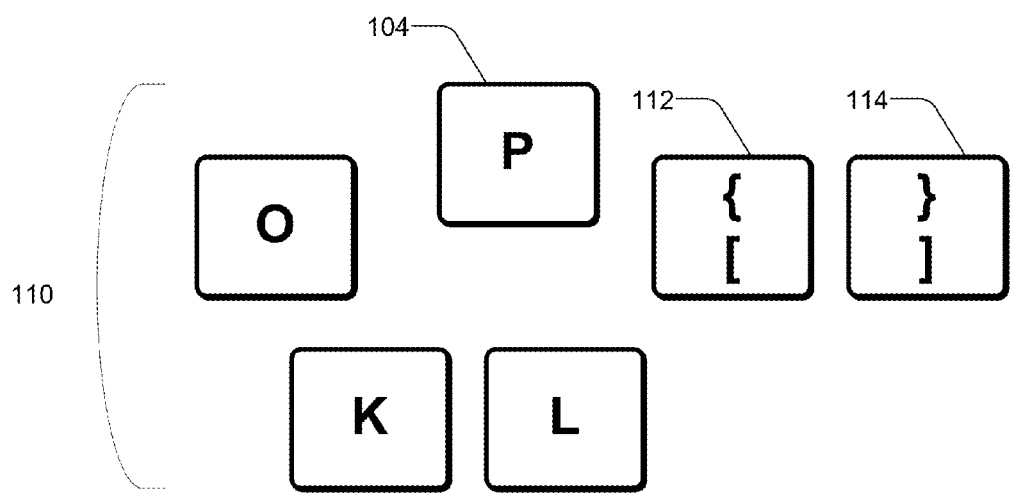
Figure 1C:
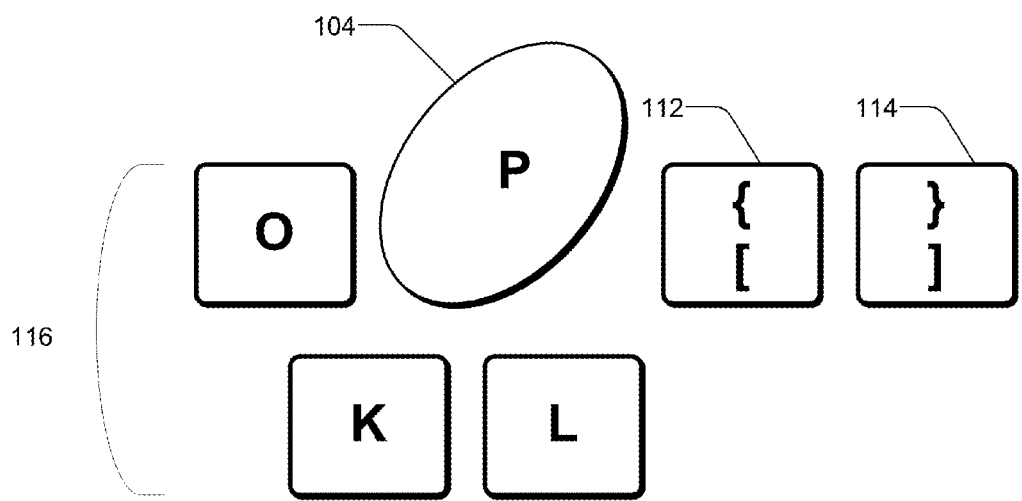

FIGS. 1A, 1B, and 1C depict example keyboard arrangements in accordance with embodiments. FIG. 1A shows a portion of a keyboard arrangement 102 of an example keyboard (in this case a portion of a QWERTY keyboard arrangement). As shown, a user is attempting to press the "P" key 104 using an actuator 106 (e.g., the user's finger). One or more sensors may determine an area 108 where the user has made a gesture (e.g., attempting to select the key). FIG. 1A shows an example where the user has successfully selected the "P" key, but has done so in a slightly off-center location relative to a more centered and/or more optimal location for selecting the "P" key. This may be considered a near-mistype.

On detecting such an off-center and/or non-optimal key selection, embodiments may modify the keyboard arrangement to attempt to minimize future typing errors. For example, as shown in FIG. 1B, a modified keyboard arrangement 110 may include a change in the location of the "P" key 104 to move the key closer to the location where the user gestured. Moreover, the modifications may also include a change in location of other keys such as keys 112 and 114 to accommodate the location change of the "P" key 104.

Moreover in some embodiments modification of a keyboard arrangement may further include a change in the size, shape, caption (e.g., key label), and/or orientation of one or more keys, instead of or in addition to a location change. For example, as shown in FIG. 1C, a modified keyboard arrangement 116 may include a change in size, shape, caption, and/or orientation of the "P" key 104 to have the key encompass at least a portion of the area where the user gestured, as detected by sensors. Although the examples in FIGS. 1A, 1B, and 1C show particular shapes of keys (e.g., square, elliptical, etc.), embodiments are not so limited, and keyboard modifications may include any type of change to the size, shape, location, caption, and/or orientation of keyboard elements (e.g., keys).

Further, embodiments may detect a mistype in which the user misses an intended key, and may change a shape, size, location, and/or orientation of the missed key to reduce the likelihood of such a mistype occurring in the future. In some embodiments, mistypes may be detected based on contextual analysis (e.g., spelling, syntax, and/or grammar checking of the input text), other error detection methods, and/or any combination of these.

In some embodiments, keyboard modification may be based on detecting a currently active application. For example, a keyboard optimized for word processing may be provided to a user when using a word processing application, and a different keyboard may be provided to the user when playing a game. Embodiments may monitor the user's activities on the computing device, and switch from one keyboard arrangement to another on detecting a change of active application. In some embodiments, a modified keyboard arrangement may be customized to a particular application, and may include more or fewer keys, specialized keys, and/or keys in particular locations or configurations to optimize information input for the application.

In the examples of FIGS. 1A, 1B, and 1C, keyboard modifications are depicted as modifications of the positional and/or visible layout of the keyboard presented to the user. However, embodiments are not so limited. In some embodiments, keyboard modification includes modifying a response profile of the keyboard arrangement based on the detected user activities. For example, in response to the off-center selection of the "P" key 104 (e.g., as shown in FIG. 1A), embodiments may modify a hotspot for the "P" key such that subsequent off-center selections of the "P" key 104 are interpreted as the user selecting "P". Embodiments may make such a modification of the response profile of the keyboard arrangement instead of, or in addition to, an alteration of the positional layout of the presented keyboard arrangement. Accordingly, as used herein, a modification may refer to a modification of the presentation of the layout of the keyboard arrangement (e.g., how the user sees or otherwise perceives the keyboard) and/or a modification of the response profile of the keyboard arrangement (e.g., how the system responds to a user's input to the keyboard). Moreover, as used herein, a keyboard arrangement include the response profile that enables embodiments to interpret user inputs to the keyboard arrangement.

In some embodiments, the modified keyboard may be provided within the interface of a computing device. For example, a keyboard may be presented to the user within a touch-enabled screen of a tablet computing device, eBook reader, smart phone, or other device. Embodiments may use a device's built-in touch sensors to monitor the user's gestures while inputting information via the keyboard, and modify the keyboard arrangement to minimize errors in the information input.

However, embodiments are not limited to use in a device with a touch-enabled screen. In some embodiments, an environment may include a projector that projects a keyboard arrangement onto a surface indicated by a user and/or in proximity to a user, such as a table top or other stationary object, a held object such as a book or plate, or a body part such as the user's thigh. A plurality of sensors nearby may then monitor the user's gestures relative to the projected keyboard arrangement, and send sensor data to a computing device which analyzes the data to modify the keyboard arrangement based on detected gestures. In this way, any arbitrary surface or object that is convenient to the user may be rendered on-the-fly into a keyboard for the user to enter information, freeing the user from any dedicated keyboard peripheral.

Moreover, in some embodiments the keyboard arrangement may be abstracted away from a physical object and may be rendered at least in part as an abstract arrangement in space proximal to the user. In this way, the user may gesture into the nearby space and sensor data for the detected user gestures may be interpreted as user input to the abstract keyboard arrangement. In such cases, the abstract keyboard arrangement may be modified based on the detected gestures to minimize potential errors.

The projected keyboard arrangement embodiment and the abstracted keyboard arrangement may provide a useful means for the user to enter data in situations where he/she may wish to use a keyboard in an arbitrary location and/or for a short period of time, such as to enter a short text message or instant message to be sent using a device that may not have a dedicated hardware-based keyboard (e.g., a smartphone).

Illustrative Environment

Figure 2A:
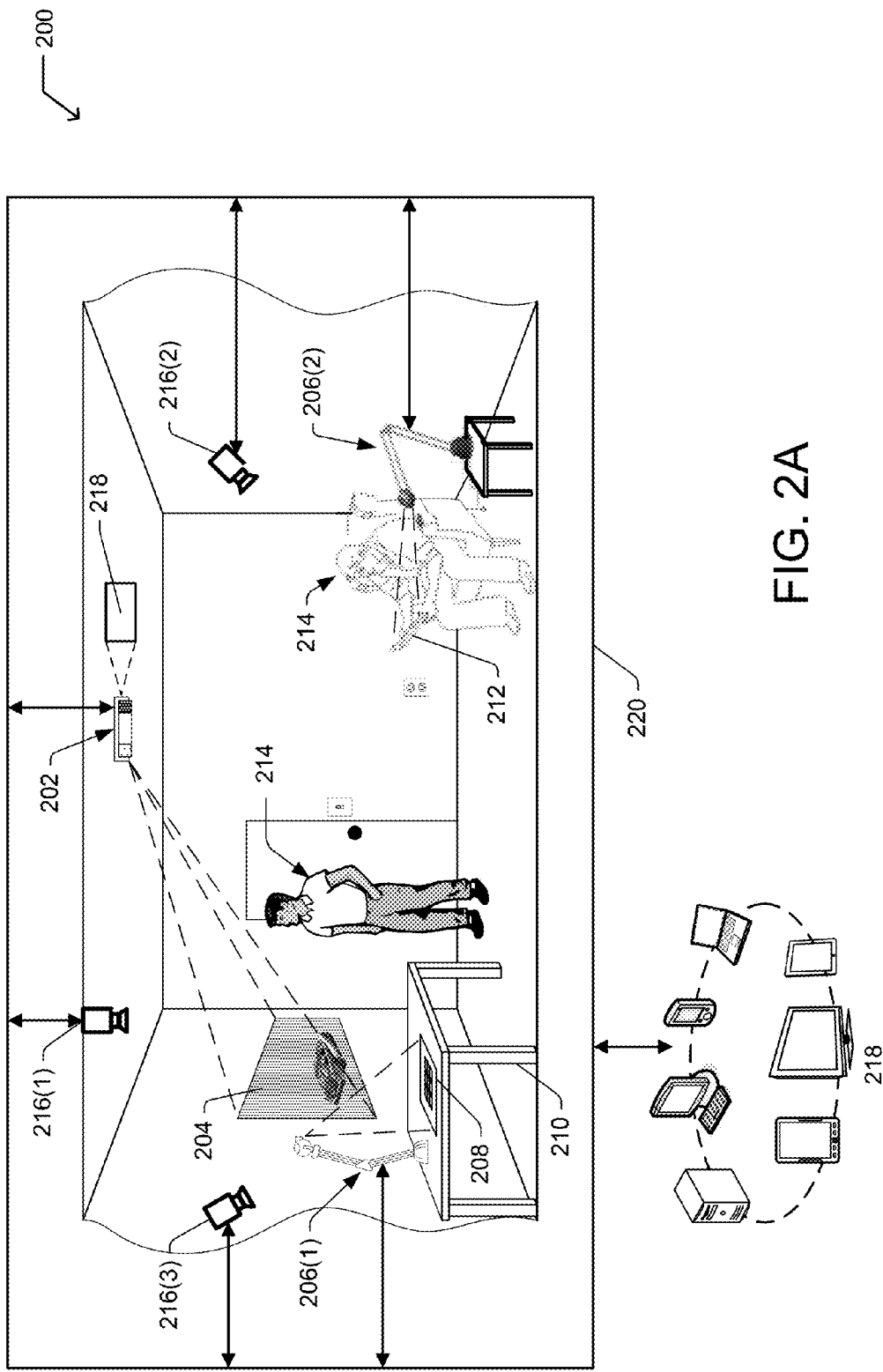
FIGS. 2A and 2B depict example environments in which embodiments may operate.

FIG. 2A shows an example environment 200 in which embodiments may operate. In the example shown, environment 200 is an indoor space (e.g., a home, office, or other environment). However, some embodiments may also operate in an outdoor setting or some combination of indoor and outdoor space. In the example shown, environment 200 includes a surface-mounted augmented reality functional node (ARFN) 202. In embodiments, an ARFN may include one or more projectors, cameras and other sensors, and/or computing resources (e.g., a computing device 218) to generate an augmented reality environment. In the example shown, the surface-mounted ARFN 202 projects a display 204 onto a wall, screen or other object. Embodiments also support the use of a network-connected display device such as a monitor, television, or other type of display to display information to a user.

As shown, environment 200 may also include one or more ARFNs sitting atop surfaces, such as ARFNs 206(1) and 206(2). In some embodiments, such ARFNs may sense the location of users and/or objects, and project a keyboard arrangement, display, or other visual information onto a surface. Although in this example ARFNs 206(1) and 206(2) are depicted as configured similarly to table lamps, other ARFN configurations are supported by embodiments. The ARFNs in environment 200 may project a keyboard arrangement 208 onto a stationary object such as a table 210, or a hand-held or otherwise more mobile object such as a hand-held object 212 held by user 214. ARFNs are described in further detail with reference to FIG. 3. Embodiments may employ any number of ARFNs to project images and/or gather sensor information about environment 200. Moreover, although not shown in FIG. 2, embodiments support projectors not incorporated into ARFNs for projecting a keyboard arrangement or displaying other information.

Moreover, in some embodiments, environment 200 may also include one or more sensor devices not associated with ARFNs, such as sensors 216(1), 216(2), and 216(3). Such sensor devices may incorporate any sensor technology that operates to detect position and/or movement of objects and/or portions of objects in a space such as environment 200. Sensor devices may include cameras or other sensors to detect visible light, infrared light, or other types of electromagnetic radiation. In some embodiments, sensor devices may include time-of-flight (ToF) cameras that determine distance to an object based on measuring the time-of-flight of the light travelling between the object and the camera. Sensor devices may also incorporate other types of Light Detection and Ranging (LIDAR) optical sensing technologies. Sensor devices may also include RGB cameras, or RGBZ cameras that include both ToF and RGB sensors.

Although sensors 216(1), 216(2), and 216(3) are depicted as cameras, embodiments are not so limited and may employ sensors to collect other types of information. For example, sensors may include pressure sensors (e.g., on a touchpad) to detect physical pressure caused by the presence or motion of an object or person, charge sensors to detect an electric charge and/or magnetic field caused by a presence or motion of an object or person, microphones to detect sonic, infrasonic, and/or ultrasonic data and locate their source, light reflection detectors to detect location or motion of objects based on reflected light (e.g., coherent light such as that in a laser). In embodiments, sensors of various types may be arranged in a particular configuration within environment 200 to collect data suitable as input to a triangulation or other data analysis algorithm, to determine locations, identifications, and/or movements of objects or persons within environment 200.

In some embodiments, environment 200 may also include one or more computing device(s) 218. In some embodiments, computing device(s) 218 may be owned by, operated by, and/or otherwise associated with user 214. Computing device(s) 218 may include any type of computing device, including but not limited to desktop computers, network computers, server computers, workstations, personal computers, laptop computers, tablet computers, electronic book (eBook) readers, wearable computers, mobile phones, automotive computers, personal data assistants (PDAs), game consoles, mobile gaming devices, and the like. As shown in FIG. 2A, computing device(s) 218 may be incorporated into ARFN(s) 202, 206(1), and/or 206(2), or may be separate, stand-alone computing device(s) that communicate with ARFN(s) via networks 220.

As described further herein, computing device(s) 218 may include one or more software components that receive sensor data from sensors incorporated into ARFNs or stand-alone sensors, analyze the data to identify gestures made by user 214, modify keyboard arrangement 208 based on the identified gestures, and provide the modified keyboard arrangement to ARFNs 206(1) and 206(2) to be displayed for user 214.

In some embodiments, components of computing device(s) 218 may analyze sensor data to detect a presence, location, and/or movements of user 214 and/or objects (e.g., 210 and 212) available for projecting the keyboard arrangement, and select an object and/or nearby projector for projecting the keyboard arrangement based on the location of user 214. Components of computing device(s) 218 may also include components for identifying and/or authenticating user 214, and providing a keyboard arrangement that has been personalized for user 214. Computing device(s) 218 are described further herein with reference to FIG. 4.

The devices of environment 200 may communicate with one another and with external devices via one or more networks 220. Networks 220 may include public networks such as the Internet, private networks such as an institutional and/or personal intranet, or some combination of private and public networks. Networks 220 may also include any type of wired and/or wireless network, including but not limited to local area networks (LANs), wide area networks (WANs), Wi-Fi, WiMax, and mobile communications networks (e.g. 3G, 4G, and so forth). Networks 220 may utilize communications protocols, including packet-based and/or datagram-based protocols such as internet protocol (IP), transmission control protocol (TCP), user datagram protocol (UDP), or other types of protocols. Moreover, networks 220 may also include a number of devices that facilitate network communications and/or form a hardware basis for the networks, such as switches, routers, gateways, access points, firewalls, base stations, repeaters, backbone devices, and the like.

Figure 2B:
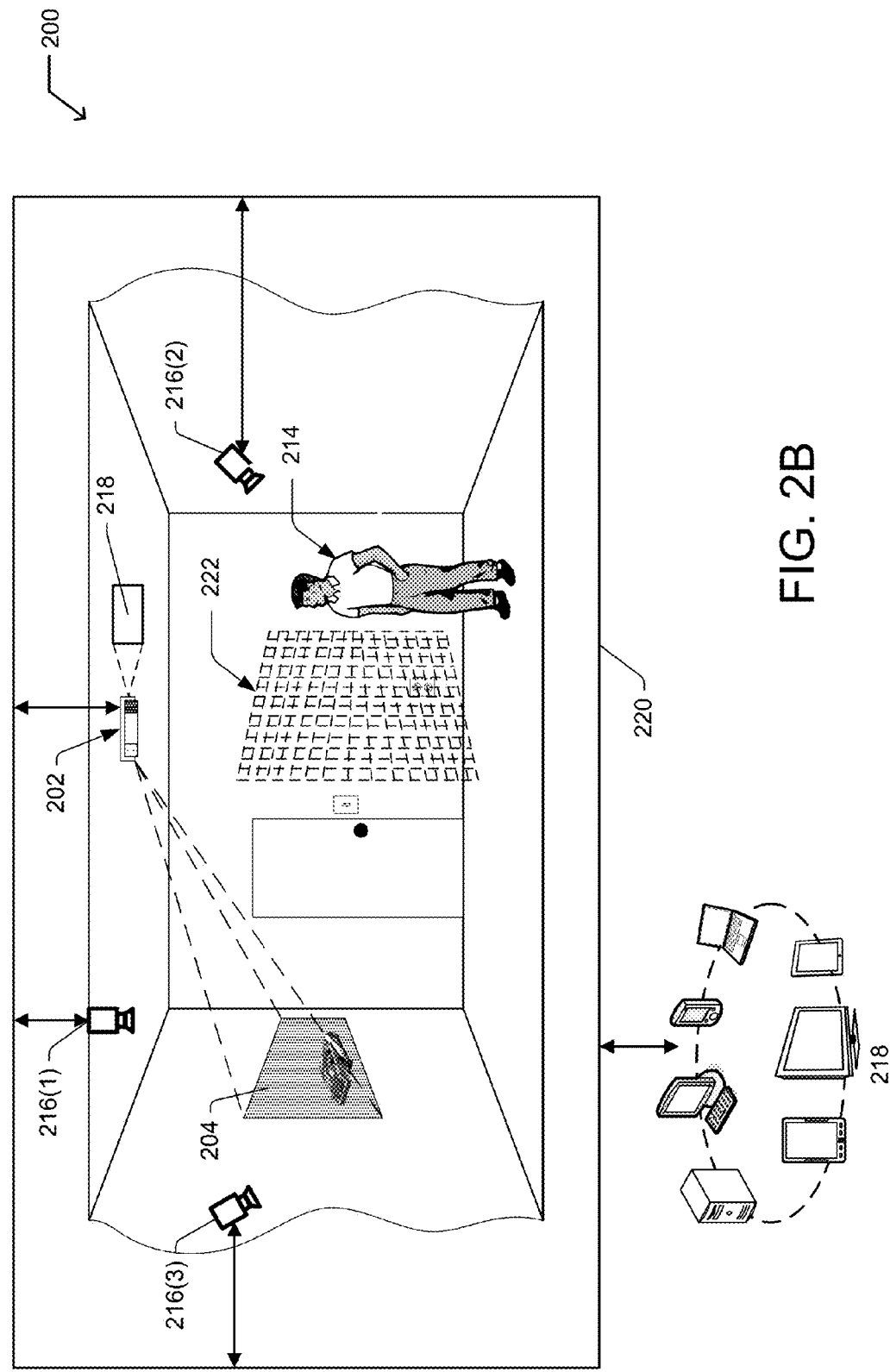

Whereas FIG. 2A illustrates embodiments in which a keyboard arrangement 208 is projected onto an object in proximity to user 214, FIG. 2B illustrates embodiments in which a keyboard arrangement is rendered as an abstract keyboard arrangement 222 in a space that is proximal to user 214. In such embodiments, the gestures of user 214 into the space may be detected by ARFNs 202 and 206, and/or sensors 216 and analyzed by computing device(s) 218 to interpret the gestures of user 214 as interacting with the abstract keyboard arrangement 222. In such embodiments, ARFNs 202 and 206 and/or sensors 216 may track a changing location of user 214 and adjust the virtual location of the keyboard arrangement 222 accordingly.

Moreover, in such embodiments there may not be a visible indication of the keyboard arrangement in the space where it is rendered, and thus the keyboard arrangement may be virtualized. In such cases, visual feedback provided through the display and/or audio feedback provided through audio output devices, may help guide the user's hand and/or finger position(s) to allow interaction with the abstract keyboard arrangement. For example, some embodiments may provide for a hint keyboard (or a portion of a hint keyboard) to be displayed to the user visually (e.g., through display 204). In such cases, the hint keyboard may present at least a portion of the keyboard arrangement and/or position(s) of the user's hands or fingers to help guide the user's interaction with the abstract keyboard arrangement.

As discussed above, embodiments enable the storage of keyboard modification data for the user on local and/or remote storage device(s). Moreover, some embodiments provide for the use of the same stored keyboard modification data to provide keyboard arrangements across multiple devices of the user, including multiple devices that are of a same type (e.g., multiple tablets) or multiple devices that are of a different type (e.g., a tablet and a smartphone). Further, embodiments provide for the use of the same stored keyboard modification data for the user when he/she is present in different environments. For example, a user may go to a friend's house to play a game, and the keyboard modification data previously determined for that user may be retrieved (e.g., from a cloud server) and used to render a keyboard arrangement for the user in his/her friend's environment.

Illustrative Computing Device Architecture

Figure 3:
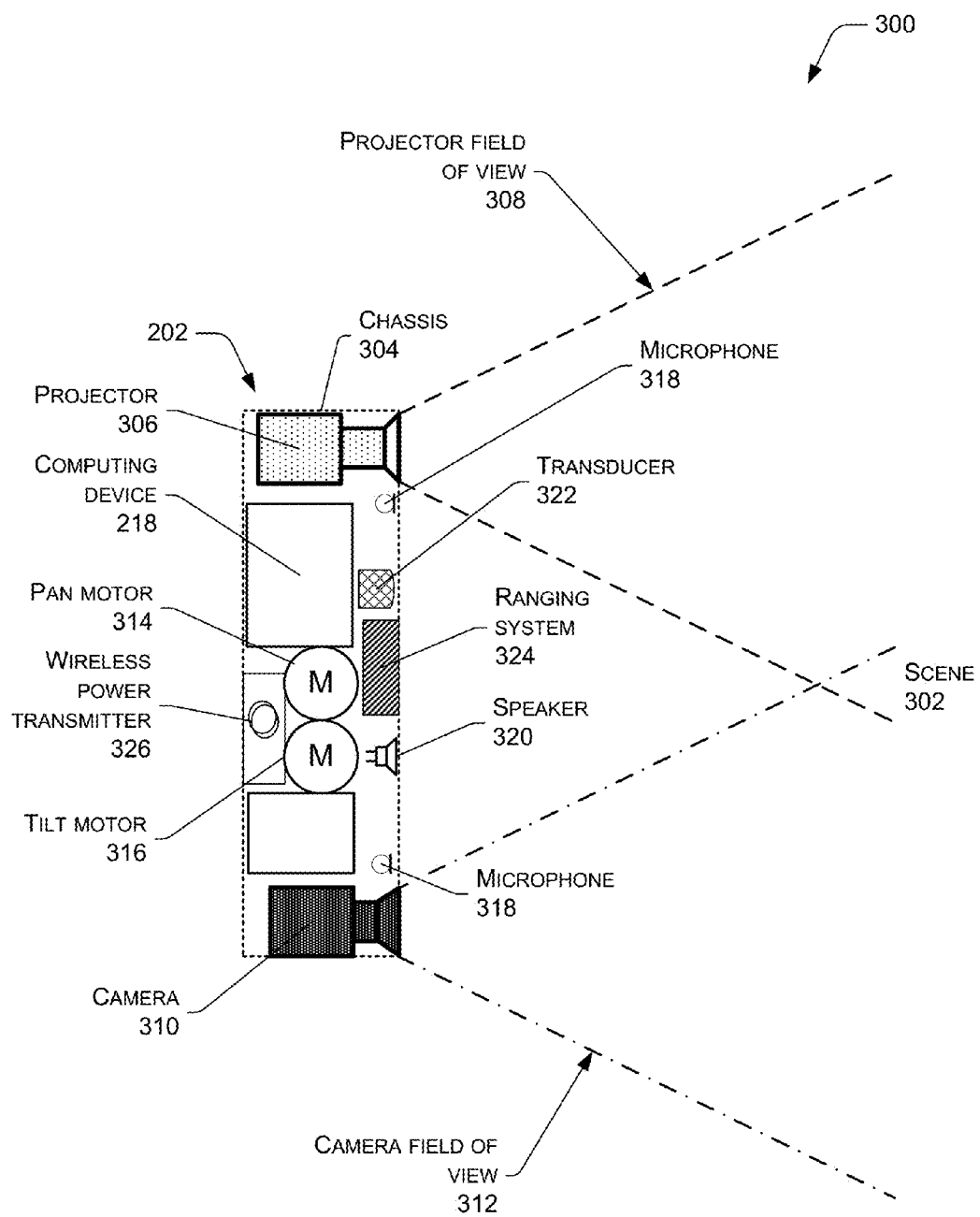
FIG. 3 shows an illustrative schematic of an augmented reality functional node.

FIG. 3 shows an illustrative schematic 300 of an ARFN, such as ARFNs 202 and 206 shown in FIG. 2. In the example shown, the ARFN 202 is configured to scan at least a portion of a scene 302 (e.g., a scene within environment 200) and/or the objects therein. The ARFN 202 may also be configured to provide augmented reality output, such as images, sounds, and so forth. In some embodiments, ARFN 202 may project a keyboard arrangement that is personalized for a user, as described further herein.

In the example shown, a chassis 304 holds the components of the ARFN 202. The chassis 304 may house a projector 306 that generates and projects images into a scene 302. These images may be visible light images perceptible to the user, visible light images imperceptible to the user, images in non-visible light (e.g., infrared radiation or some other non-visible portion of the electromagnetic spectrum), or any combination thereof. The projector 306 may be implemented with any number of technologies capable of generating an image and projecting that image onto a surface within the environment. Suitable technologies include a digital micromirror device (DMD), liquid crystal on silicon display (LCOS), liquid crystal display, (LCD), and so forth. The projector 306 may have a projector field of view 308 which describes a particular solid angle. The projector field of view 308 may vary according to changes in the configuration of the projector. For example, the projector field of view 308 may narrow upon application of an optical zoom to the projector. In some implementations, a plurality of projectors 306 may be used. Further, in some implementations, the projector 306 may be further configured to project patterns, such as non-visible infrared patterns, that can be detected by camera(s) or other sensors and used for 3D reconstruction and modeling of the environment. The projector 306 may comprise a microlaser projector, a digital light projector (DLP), cathode ray tube (CRT) projector, liquid crystal display (LCD) projector, light emitting diode (LED) projector, or other projection technologies.

In some embodiments, a camera 310 may also be housed within the chassis 304. The camera 310 may be configured to image the scene in visible light wavelengths, non-visible light wavelengths, or both. The camera 310 may be implemented in various ways. In some cases, the camera may be embodied an RGB camera. In other cases, the camera may include ToF sensors. In still other cases, the camera 310 may be an RGBZ camera that includes both ToF and RGB sensors. The camera 310 may have a camera field of view 312 which describes a particular solid angle. The camera field of view 312 may vary according to changes in the configuration of the camera 310. For example, an optical zoom of the camera may narrow the camera field of view 312. In some implementations, a plurality of cameras 310 may be used.

The chassis 304 may be mounted with a fixed orientation, or be coupled via an actuator to a fixture such that the chassis 304 may move. Actuators may include piezoelectric actuators, motors, linear actuators, and other devices configured to displace or move the chassis 304 or components therein such as the projector 306 and/or the camera 310. For example, in at least one implementation, the actuator may comprise a pan motor 314, tilt motor 316, and so forth. The pan motor 314 is configured to rotate the chassis 304 in a yawing motion. The tilt motor 316 is configured to change the pitch of the chassis 304. By panning and/or tilting the chassis 304, different views of various scenes within the environment may be acquired. In some embodiments, the user/object tracking module 422 (further described with regard to FIG. 4) may use the different views to track or otherwise monitor objects and/or users within the environment.

In some embodiments, one or more microphones 318 may be housed within the chassis 304, or elsewhere within the environment 200. These microphones 318 may be used to acquire voice or sound input from the user, for echolocation, location determination of a sound, or to otherwise aid in the characterization of and receipt of input from the scene. For example, the user may make a particular noise, such as a tap on a wall or snap of the fingers, which are pre-designated to initiate an augmented reality function such as the display of a keyboard arrangement onto a nearby surface or the rendering of an abstract keyboard arrangement into a nearby space. The user may alternatively use voice commands. Such audio inputs may be located within the scene using time-of-arrival differences among multiple microphones and used to determine an active zone (e.g., a zone in which a user and/or object(s) are present and/or active) within the augmented reality environment. Further, the microphones 318 may be used to receive voice input from the user for purposes of identifying and authenticating the user. The voice input may be received and passed to the user identification/authentication component 420 (described with reference to FIG. 4) for analysis and verification.

One or more speakers 320 may also be present to provide audible output. For example, the speakers 320 may be used to provide output from a text-to-speech module, to playback pre-recorded audio, to provide audio associated with a multi-media presentation, and so forth.

A transducer 322 may be present within the ARFN 202, or elsewhere within the environment 200, and configured to detect and/or generate inaudible signals, such as infrasound or ultrasound. The transducer may also employ visible or non-visible light to facilitate communication. These inaudible signals may be used to provide for signaling between accessory devices and the ARFN 202, and/or between ARFN 202 and other ARFNs in environment 200.

A ranging system 324 may also be provided in the ARFN 202 to provide data describing a distance from the ARFN to an object or set of objects. The ranging system 324 may comprise radar, LIDAR, ultrasonic ranging, stereoscopic ranging, and so forth. In some implementations, the transducer 322, the microphones 318, the speaker 320, or a combination thereof may be configured to use echolocation or echo-ranging to determine distance and spatial characteristics.

A wireless power transmitter 326 may also be present in the ARFN 202, or elsewhere within the augmented reality environment. The wireless power transmitter 326 may be configured to transmit electromagnetic fields suitable for receipt by a wireless power receiver and conversion into electrical power for use by active components in other electronics. The wireless power transmitter 326 may also be configured to transmit visible light and/or non-visible electromagnetic radiation to communicate power. The wireless power transmitter 326 may utilize inductive coupling, resonant coupling, capacitive coupling, and so forth.

In this illustration, the computing device 218 is shown within the chassis 304. However, in other implementations all or a portion of the computing device 218 may be disposed in another location and coupled to the ARFN 202 (e.g., through network 220). This coupling may occur via wire, fiber optic cable, wirelessly, or a combination thereof. Furthermore, additional resources external to the ARFN 202 may be accessed, such as resources in other ARFN(s), external sensor(s), external projector(s), and/or other computing device(s) accessible via a local area network, cloud resources accessible via a wide area network connection, or a combination thereof.

In various implementations, the components of the ARFN 202 may be distributed in one or more locations within the environment 200. As mentioned above, microphones 318 and/or speakers 320 may be distributed throughout the environment as stand-alone devices or as part of other ARFN(s). In some embodiments, the projector 306, the camera 310, and/or other sensors may also be distributed throughout the environment 200 as stand-alone devices, and/or located in one or more separate chassis as part of separate ARFN(s) distributed in environment 200.

Figure 4:
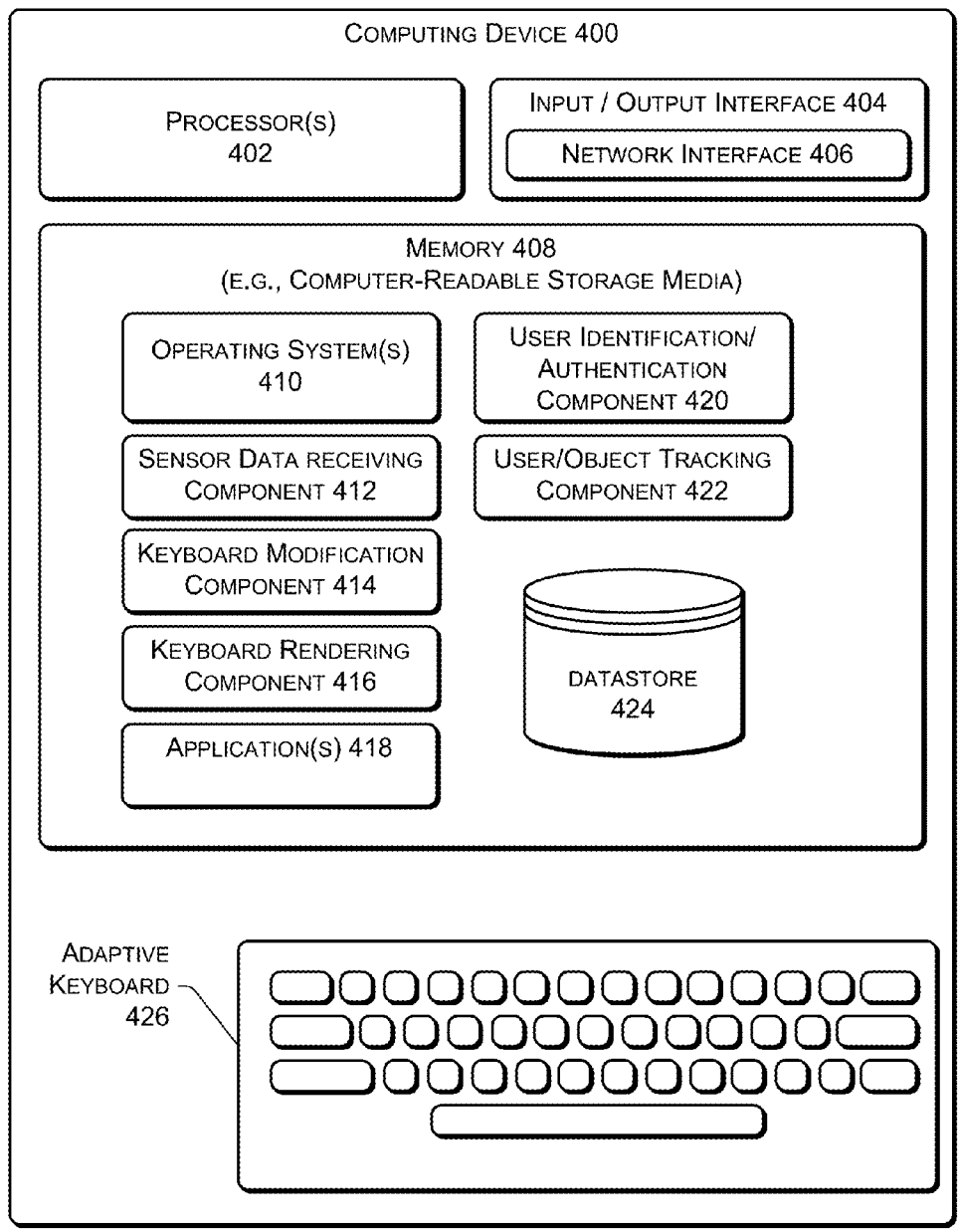
FIG. 4 depicts a diagram of an example architecture for a computing device.

FIG. 4 depicts an example computing device 400 that may be used to implement various embodiments described herein. For example, computing device 400 may provide an example system architecture for computing device(s) 218 that may be incorporated in an ARFN or external to an ARFN. In some embodiments, computing device 400 includes one or more processors 402. Processor(s) 402 may be implemented as hardware, software, or some combination thereof. Processor(s) 402 may also include computer-executable, processor-executable, and/or machine-executable instructions written in any suitable programming language to perform various functions described herein.

Computing device 400 may further include one or more input/output interfaces 404 to allow computing device 400 to communicate with other devices such as user input peripheral devices (e.g., a keyboard, a mouse, a pen, a game controller, a voice input device, a touch input device, gestural input device, and the like), and/or output peripheral devices (e.g., a display, a printer, audio speakers, a haptic output, and the like).

Input/output interface 404 may also include one or more network interfaces 406 to enable communications between computing device 400 and other networked devices (e.g., over network 220). Such network interfaces 406 may include one or more network interface controllers (NICs) or other type of transceiver device to send and receive communications over a network. Computing device 400 may also include one or more busses and/or other internal communications hardware or software that allow for the transfer of data and/or internal communications between the various components of computing device 400.

As shown in FIG. 4, computing device 400 includes a memory 408, which may include volatile memory such as random access memory (RAM), static random access memory (SRAM), dynamic random access memory (DRAM), cache memory, and the like. Memory 408 may also include non-volatile memory such as read only memory (ROM), flash memory, and the like. Moreover, memory 408 may also include cache memory, active memory, and/or physical memory used by various processes that run based on instructions and data stored within memory 408.

Memory 408 includes computer-readable storage media, which is a form of computer-readable media. Computer-readable storage media may include non-removable storage (e.g., a hard drive) and/or removable storage including magnetic disk storage, optical disk storage, tape storage, storage arrays, storage area networks, network attached storage, cloud storage, and the like. Disk drives and associated computer-readable media may provide non-volatile storage of computer readable instructions, data structures, program modules, and other data for the operation of computing device 400.

As used herein, computer-readable media includes two distinct types of media: storage media and communications media. With regard to storage media, embodiments may be provided as a computer program product stored on a non-transitory computer-readable or machine-readable storage medium. Computer-readable or machine-readable storage media includes tangible and/or non-transitory forms of media such as volatile and/or non-volatile memory. Such media may be included in a device and/or hardware component that is part of a device or external to a device, including but not limited to RAM, SRAM, DRAM, ROM, erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, or any other non-transmission memory, device, and/or medium that can be used to store and maintain information for access by a computing device. Computer storage media may store information in the form of instruction sets, data structures, applications, program modules and the like, that may be used to program a computing device or processor and thus enable a computing device or processor to perform actions. The stored information may be stored in a compressed or uncompressed form.

In contrast to the tangible storage media described above, communication media is non-tangible (e.g., transitory) and may include data (e.g., computer instruction sets, data structures, program modules, and the like) transmitted in a modulated data signal such as a carrier wave. Embodiments may also be provided as a computer program product including a transitory machine-readable signal (in compressed or uncompressed form). Examples of machine-readable signals, whether modulated using a carrier or not, include but are not limited to signals that a computer system or machine hosting or running a computer program can be configured to access, including signals downloaded through the Internet or other networks. For example, distribution of software may be via Internet download. Thus, tangible computer storage media does not include non-tangible communication media.

In some embodiments, memory 408 includes one or more executing operating systems (OS) 410, and one or more stored and/or executing processes including components, programs, or applications that are loadable and executable by processor(s) 402. In the example shown, memory 408 includes a sensor data receiving component 412 that receives sensor data from one or more sensors (e.g., sensors 216) indicating locations and/or movements of objects and/or persons. Memory 408 may also include a keyboard modification component 414 that analyzes sensor data, identifies user gestures based on the sensor data, and determines one or more modifications to a keyboard arrangement based on the identified gestures or other information. Memory 408 may also include a keyboard rendering component 416 to render the modified keyboard arrangement and provide it for display by an internal display (e.g., as in the case of a tablet computer) to an external display device (e.g., keyboard projectors 206 or some other display device).

Memory 408 may also include one or more applications 418. Such applications may include virtually any type of application executable by a computing device, including but not limited to word processing applications, spreadsheet application, communications applications, games, multimedia clients, and so forth. In some embodiments, a keyboard arrangement may be modified based, at least in part, on a currently active application. Such embodiments are described further with regard to FIG. 8.

Memory 408 may also include a user identification and/or authentication component 420 to identify and/or authenticate a user based on various methods, including but not limited to a voice command, speech recognition, facial recognition, fingerprint, recognition, handprint recognition, retina recognition, gait (e.g., manner of walking) recognition, user-entered login, password, or identification code, security card or other document scan, or information otherwise carried in some visual or auditory signal. In some embodiments, user identification/authentication component 420 may identify or authenticate a user's credential based on a comparison to locally stored identity/authentication data, or may communicate with an external server to perform identification or authentication.

Memory 408 may also include a user and/or object tracking component 422 that employs received sensor data to determine a presence, a location, and/or movements of users and/or objects within environment 200. User/object tracking component 422 may employ a triangulation, depth sensing, or other algorithm to calculate location or motion. In some embodiments, memory 408 also includes a datastore 424 (e.g., a database) to store information for operations of computing device 400. For example, datastore 424 may store keyboard arrangement data for a keyboard arrangement that has been personalized for a user based on detected gestures of the user. Datastore 424 may also store received sensor data, user identification or authentication data, or other information. In some embodiments, some or all of the data used for operations of computing device 400 may be stored in a data storage device that is external to computing device 400.

In embodiments where a keyboard arrangement is provided for a user on a device that includes a touchscreen or other suitable combination of display(s) and sensor(s) for displaying a keyboard (e.g., a tablet computing device or eBook reader), computing device 400 may include an adaptive keyboard 426 that may be personalized for a user of computing device 400 based on sensor data indicating gestures by the user. In embodiments that provide a keyboard arrangement via one or more projectors, the keyboard arrangement data may be communicated with the one or more projectors via network interface 406.

Illustrative ARFN Operation

Figure 5:
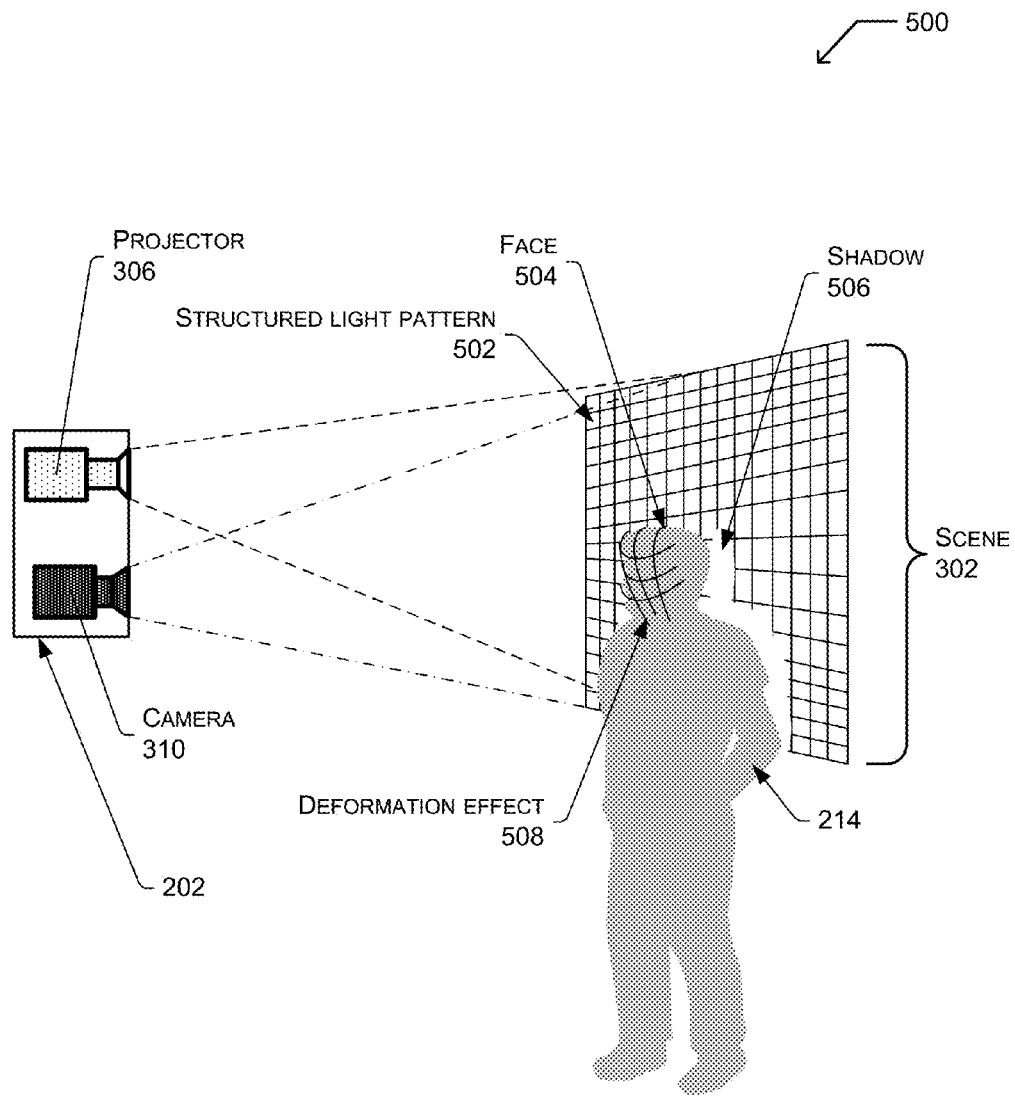
FIG. 5 illustrates an example operation of an augmented reality functional node of creating an augmented reality environment by projecting a structured light pattern on a scene and capturing a corresponding image of the scene.

FIG. 5 illustrates one example operation 500 of the ARFN 202 (or other ARFNs shown in FIG. 2) of creating an augmented reality environment by projecting a structured light pattern on a scene and capturing a corresponding image of the scene. In this illustration, the projector 306 within the ARFN 202 projects a structured light pattern 502 onto the scene 302. In some implementations, a sequence of different structure light patterns 502 may be used. This structured light pattern 502 may be in wavelengths which are visible to the user, non-visible to the user, or a combination thereof. The structured light pattern 502 is shown as a grid in this example, but not by way of limitation. In other implementations, other patterns may be used, such as bars, dots, pseudorandom noise (PN) patterns, and so forth. PN patterns may be particularly useful because a particular point within the PN pattern may be specifically identified. A PN function is deterministic in that given a specific set of variables, a particular output is defined. This deterministic behavior allows the specific identification and placement of a point or block of pixels within the PN pattern.

A user (e.g., user 214) is shown within the scene 302 such that the user's face 504 is between the projector 306 and a wall. A shadow 506 from the user's body appears on the wall. Further, a deformation effect 508 is produced on the shape of the user's face 504 as the structured light pattern 502 interacts with the facial features. This deformation effect 508 is detected by the camera 310, which is further configured to sense or detect the structured light. In some implementations, the camera 310 may also sense or detect wavelengths other than those used for structured light pattern 502.

In some embodiments, the structured light pattern 502 may be formed from a coherent light source such as a laser. In other embodiments, unstructured light may be employed.

The images captured by the camera 310 may be used for any number of things. For example, some images of the scene are processed by the user/object tracking component 422 to characterize the scene 302. In some implementations, multiple cameras may be used to acquire the image. In other instances, the images of the user's face 504 (or other body contours, such as hand shape) may be processed by the user/object tracking component 422 to reconstruct 3D images of the user, which are then passed to the user identification/authentication component 420 for purposes of identifying, verifying, and/or authenticating the user.

Certain features of objects within the scene 302 may not be readily determined based upon the geometry of the ARFN 202, shape of the objects, distance between the ARFN 202 and the objects, and so forth. Accordingly, in some embodiments the user/object tracking component 422 may be configured to make one or more assumptions about the scene, and test those assumptions to constrain the dimensions of the scene 302 and maintain the model of the scene.

Illustrative Process and Interfaces

Figure 6:
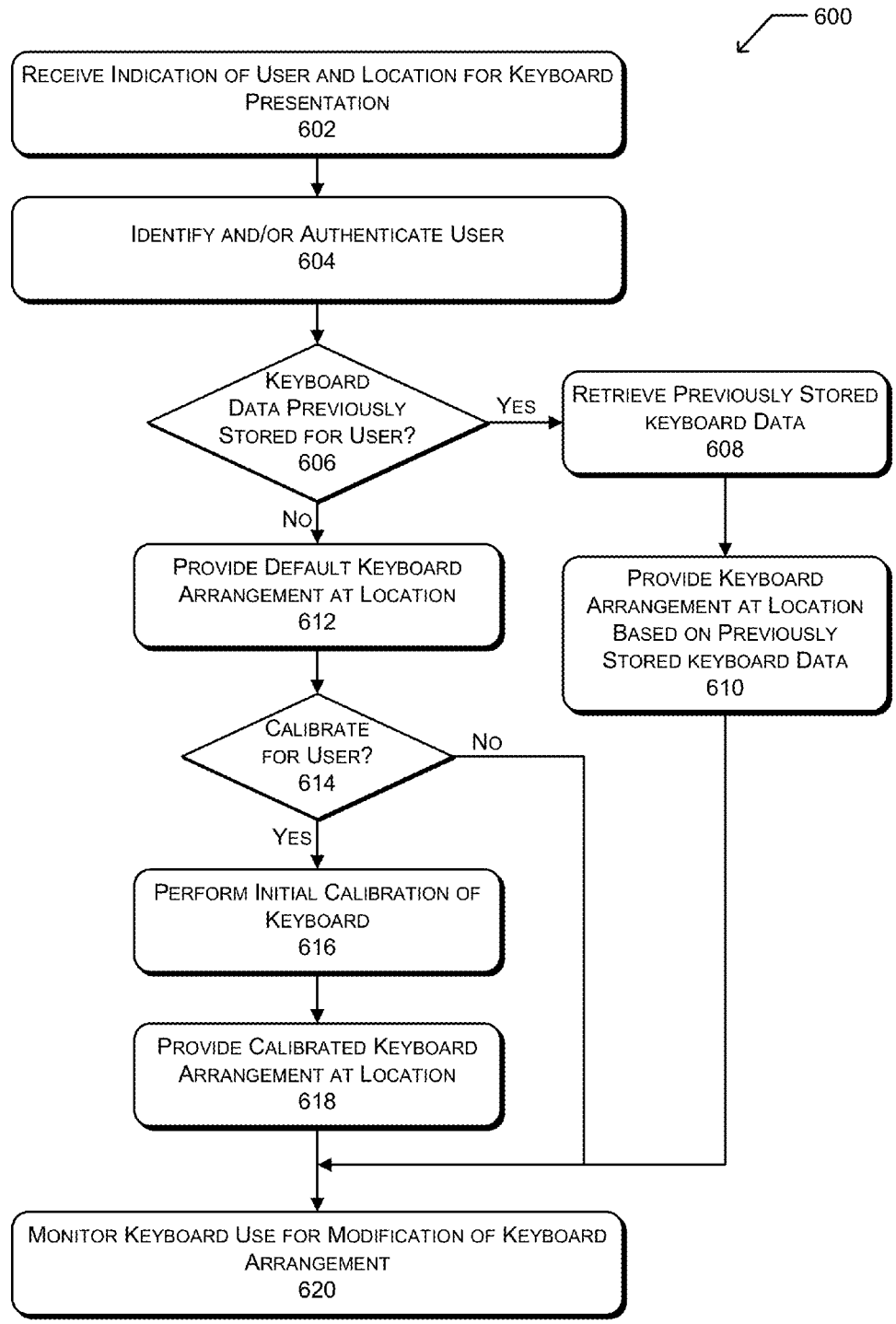
FIG. 6 depicts a flow diagram of an illustrative process for providing a keyboard arrangement that is personalized for a user.
Figure 7:
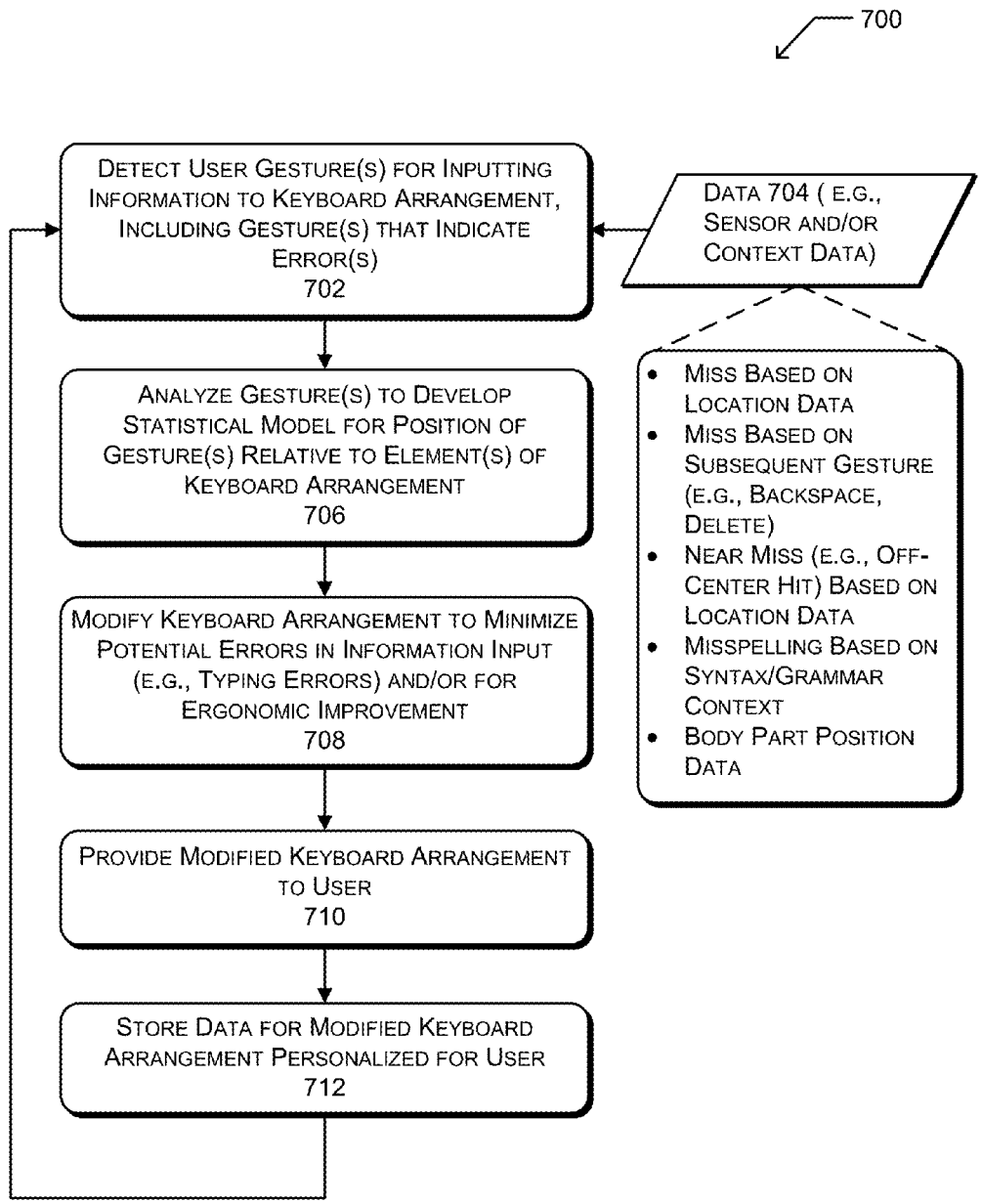
FIG. 7 depicts a flow diagram of an illustrative process for modifying a keyboard arrangement based on detected user gesture(s).
Figure 8:
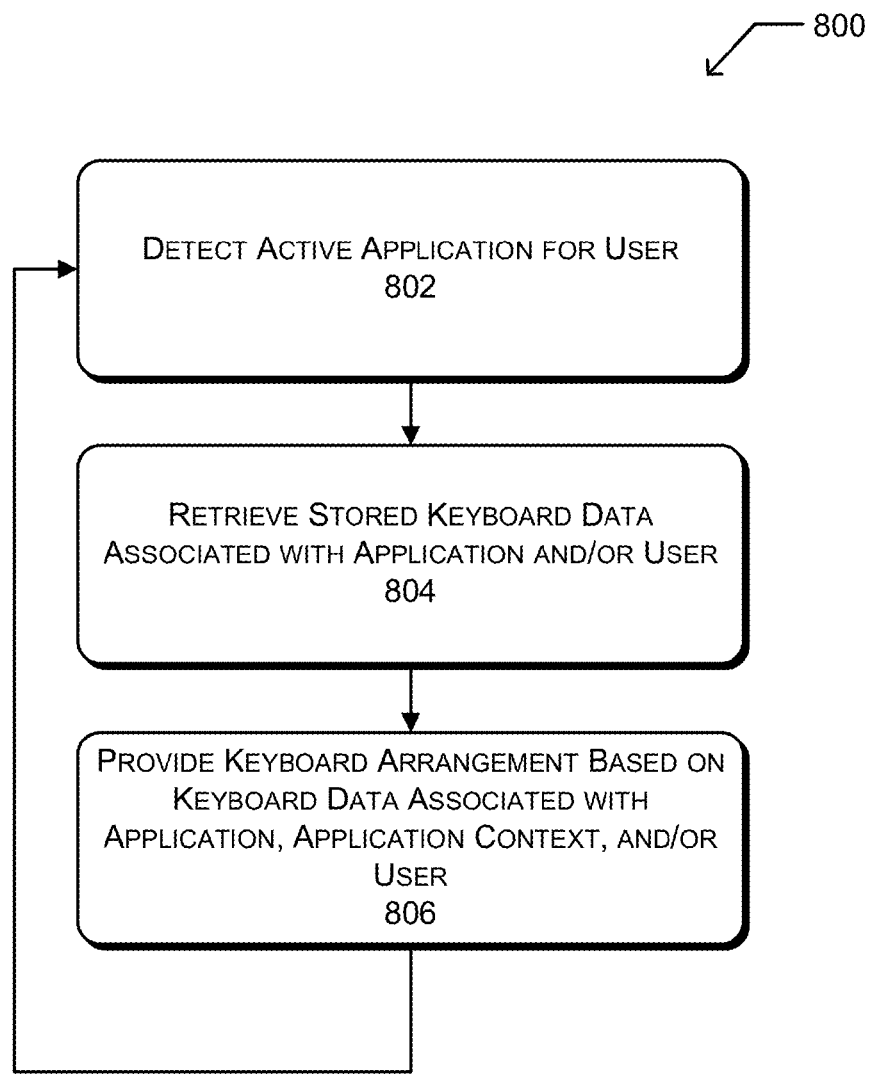
FIG. 8 depicts a flow diagram of an illustrative process for modifying a keyboard arrangement based on an active application.

FIGS. 6-8 depict flowcharts for example processes in accordance with various embodiments. The operations of the example processes are illustrated in individual blocks and summarized with reference to those blocks. The processes are illustrated as logical flow graphs, each operation of which may represent one or more operations that can be implemented in hardware, software, or a combination thereof. In the context of software, the operations represent computer-executable instructions stored on one or more computer-readable storage media that, when executed by one or more processors, enable the one or more processors to perform the recited operations. Generally, computer-executable instructions include routines, programs, objects, modules, components, data structures, and the like that perform particular functions or implement particular data types. The order in which the operations are described is not intended to be construed as a limitation, and any number of the described operations may be executed in any order, combined in any order, subdivided into multiple sub-operations, and/or executed in parallel to implement the described process.

In some embodiments, processes depicted in FIGS. 6-8 execute on a computing device such as computing device(s) 218, and/or include operations performed by one or more components of computing device 400.

FIG. 6 depicts a flow diagram of an illustrative process 600 for providing a keyboard arrangement that is personalized for a user, in accordance with embodiments. At 602, an indication is received of a user and/or possible location for presentation of a keyboard arrangement. In some embodiments, the indication of the user may be based on sensor data that detects a position of the user and/or an entrance of the user into environment 200. Indication of a possible location for a keyboard arrangement may be based on sensor data that shows a suitable surface or object for projection of the keyboard arrangement in proximity to the user. In some embodiments that provide for an abstract keyboard arrangement, a possible location may include a space near the user that is sufficiently empty and thus suitable for the user to gesture in while interacting with the abstract keyboard arrangement.

At 604, the user may be identified and/or authenticated. In some embodiments, the user may be identified based on received sensor data to recognize the user's face, handprint, fingerprint, retina, or other distinguishing characteristic of the user's physical appearance. In some embodiments, motions of the user may be used to identify the user, such as through gait recognition or through a distinctive gesture that is associated with the user. In some embodiments, the user may provide information to identify himself or herself, such as through a spoken word or phrase, a particular sound that is associated with the user (e.g., a distinctive whistle, pattern of claps or finger snaps/pops, etc.), or a typed or spoken personal name, user name, or other user identification. In some embodiments, the user may be presented with a user interface element (e.g., a drop-down list of known users) and prompted to select his/her user name from a list of known users, or indicate that he/she is a new user. In some embodiments, the user may be further authenticated for security or other reasons, via a spoken, typed, or otherwise entered password, pass phrase, security question answer, identification number, gestural pattern, or other information.

In some embodiments, a user may be identified based on a distinctive placement of his/her hands on a surface (e.g., on a table), and the keyboard arrangement may be provided at a location corresponding to the location where the user has placed his/her hands.

At 606, a determination is made whether keyboard data for a previously personalized keyboard arrangement has been stored for the identified user. If so, at 608 the previously stored keyboard data is retrieved from data storage and, at 610, provided at the identified location.

If, at 606, a determination is made that keyboard data has not been stored for the identified user, at 612 a default keyboard arrangement is provided for the user at the identified location. In some embodiments, the default keyboard arrangement may include at least some elements of a standard keyboard arrangement (e.g., a QWERTY keyboard). In some embodiments, the default keyboard arrangement may be a default arrangement that is based on a particular category, class, or characteristic of the user even if the keyboard arrangement has not yet been personalized for the particular user. For example, if sensor data indicates that the user is a child (e.g., through voice characteristics or other means), then a default keyboard arrangement adapted for child use may be provided (e.g., having fewer keys, larger keys, or other characteristics).

At 614, a determination may be made whether to perform an initial calibration of the keyboard arrangement for the user. If so, at 616 an initial calibration of the keyboard arrangement may be performed, to begin personalizing the keyboard for the particular user. In some embodiments, the calibration may include prompting the user to type a particular input string such as the alphabet or a specific phrase. Sensor data may be collected indicating the gestures made by the user while typing the calibration string, and one or more initial modifications of the keyboard arrangement may be made dynamically in response to the performed gestures, as described further herein with regard to FIG. 7. Following the initial calibration, at 618 the calibrated keyboard arrangement may be provided to the user at the identified location.

At 620, use of the keyboard arrangement may be monitored by one or more sensors, and the collected sensor data may be employed to further modify the keyboard arrangement. Such modifications are described further with regard to FIG. 7. In embodiments where an initial calibration is not performed (e.g., where there is a negative determination at 614), calibration may be performed dynamically through the ongoing monitoring at 620 of the user entering data into the keyboard arrangement.

FIG. 7 depicts a flow diagram of an illustrative process 700 for modifying a keyboard arrangement based on detected user gesture(s), in accordance with embodiments. At 702, one or more gestures are detected, the gestures performed by a user while inputting information to a computing device using a keyboard arrangement. In some cases, one or more gestures may indicate errors or near mistypes made by the user while typing.

The gesture(s) may be detected based on data 704 which may include sensor data and/or contextual data. In some embodiments, data 704 may include data indicating a near-mistype (e.g., an off-center hit of a particular key). In some embodiments, data 704 may include data indicating that the user's gesture to type a particular key missed that key. For example, sensor data may indicate that the user typed a first key and then typed a backspace or delete key, and based on that information embodiments may infer that the first key was a mistype. Moreover, in some embodiments contextual data may be employed in conjunction with sensor data to detect a mistype. For example, embodiments may employ grammar checking, syntax checking, spell checking, and the like to detect an error in the user's typing (e.g., the user typing "helli" instead of "hello"). That information may be used to infer that the user typed one key instead of the intended key (e.g., "i" instead of "o"). Data 704 may further include sensor data indicating a position of body parts (e.g., hands, arms, fingers, etc.) to be used in determining a more ergonomic keyboard arrangement for the user, as described further below.

At 706, the detected gesture(s) are analyzed to develop a statistical model for the position of the gesture(s) relative to one or more elements (e.g., keys) of the keyboard arrangement. The statistical model may model location and/or frequency for user gestures, based on data gathered over time for the user. For example, the statistical model may provide information regarding plurality of locations where the user gestures when attempting to type a particular key (e.g., the "P" key) and a frequency at which the user gestures at each location. In some cases, the model may incorporate a plurality of 2-dimensional or 3-dimensional histograms providing a distribution of gesture locations over time for a particular user, e.g. a map of the error rates and locations for particular keys.

At 708, one or more keyboard modifications are identified to minimize potential errors in information input (e.g., typing errors) for the particular user. In some embodiments, keyboard modifications are identified based on an analysis of the statistical model developed at 706, to determine a keyboard arrangement that minimizes potential errors. Keyboard modifications may include changing a shape, a size, a location, caption, and/or an orientation of one or more elements of the keyboard arrangement. In some embodiments, keyboard modifications may further include changing a shape of a key such that the area associated with the key is bifurcated or otherwise non-contiguous (e.g., separated into distinct portions within the keyboard arrangement). In this way, keyboard modifications over time may morph the keyboard arrangement to provide an asymptotically better fit to where the user's fingers are more naturally inclined to hit.

At 710, the modified keyboard arrangement is provided to the user. In some embodiments, the keyboard arrangement may be dynamically modified within a single session of the user using the keyboard arrangement, such that the keyboard is being rearranged as the user types. In other embodiments, the user's gestures during a first session using a keyboard arrangement may be analyzed after the first session completes, and a modified keyboard arrangement may be provided for the user the next time he/she logs on.

At 712, the modified keyboard arrangement data may be stored in data storage locally and/or remotely, and made available to be retrieved and provided to the user the next time he/she logs in. Because the keyboard arrangement has been adapted to the user's gestures, embodiments provide for a personalized keyboard that may be increasingly optimized for the user over time. After 712, process 700 may loop back to 702 to detect further gesture(s) made by the user and continue refining and/or optimizing the personalized keyboard arrangement for the user.

In some embodiments, contextual data may be further used to dynamically refine the keyboard arrangement based on an inference of a particular word that the user is typing. For example, the user may type the letters "b" and "r" and embodiments may modify the keyboard to remove those keys that are less likely to be typed next, in this case remove letter keys that are not vowels. As the user continues typing, embodiments may minimize or eliminate those keys that are less likely to be typed given the possible words being typed. In such embodiments, the refining may be based on historical data indicating words that the user is more likely to be typing.

Moreover, in some embodiments, the keyboard arrangement may be further customized based on a particular surface or object onto which the keyboard arrangement is projected. For example, a flat surface (e.g., a table) may receive a somewhat different keyboard arrangement than that projected onto a curved surface (e.g., a sofa arm). Moreover, the texture of the target object may also be used to determine keyboard arrangement. For example, a tiled surface may receive a different keyboard arrangement than that projected onto a carpeted surface.

Although the embodiments described so far provide for the adaptation of a keyboard arrangement based on detected user gestures, other embodiments enable adaptation of the keyboard to attempt to change a user's habits while typing and thus help train a user to type in a more ergonomic way. For example, if embodiments determine that a user is holding his/her hands in a way that may lead to undue physical stress or that is otherwise non-ergonomic, embodiments may gradually adapt the keyboard arrangement over time to train the user to position his/her hands in a more ergonomic configuration.

Further, in some embodiments a more or less novice typist may be allowed to develop his/her own custom keyboard arrangement that is not related to any traditional configuration (e.g., QWERTY), by employing embodiments to custom shape the keyboard arrangement based on gestures. In such cases, a user may be presented with a particular text and prompted to type the text however they see fit. Embodiments may also provide for adjustment of a keyboard arrangement for a particular user based on changes to the user's physiology, e.g. an injury, amputation, or other alteration in physical ability.

FIG. 8 depicts a flow diagram of an illustrative process 800 for modifying a keyboard arrangement based on an active application, in accordance with embodiments. At 802, an active application may be detected as in use by the user. An active application may be identified as an application that is currently executing, that is currently displayed, that is displayed highest in Z-level among a plurality of displayed applications (e.g., is top in a stack), that is currently receiving data from another process, and/or that the user is currently interacting with in some way.

At 804, stored keyboard arrangement data associated with the active application may be retrieved from data storage. In some embodiments, keyboard arrangement data may be further associated with the user as described above. In such cases, embodiments may retrieve keyboard data associated with a particular pairing of application and user.

At 806, the retrieved keyboard arrangement data is used to render a keyboard arrangement and provide it to the user. Embodiments support various types of keyboard arrangement customized for particular applications or categories of applications. For example, a keyboard optimized for a particular word processing program, or for a general class of word processing programs, may be provided to a user when using the word processing program. The customization for a particular program or class of programs may include a different set of keys in the keyboard arrangement, a different size, shape, caption, and/or orientation of the keys, specialized keys, and/or different labeling or functionality for the keys. For example, the function keys provided for a word processing program may be different than the function keys provided for a game program.

In some embodiments, the context-based modification of keyboard arrangement discussed above may be further customized to the particular application that is active. For example, if the active application is a word processing application and a user selection of the "control" key is detected, displayed key labels may be changed such that the "C" key is relabeled as "copy", and the "V" key is relabeled to "paste". Thus, keyboard modifications may include changing key captions based on the particular application and/or based on a particular task being performed with the application.

Moreover, in some embodiments the keyboard arrangement may be altered based on a particular context within the active application. For example, a user may select a numeric field in which to enter data, and embodiments may provide a keyboard arrangement that includes number keys and excludes certain other types of keys. As another example, a user may select a URL-entry field, and embodiments may provide a keyboard arrangement that includes keys for "http://", ".com", and other characters and/or strings of characters commonly used in URLs. In this way, embodiments may provide keyboard arrangements based on one or more of the following: a particular application (or class of application) that is currently being used, a particular context within the current application, and/or the particular user.

After 806, process 800 may loop back to 802 and continue monitoring the user's activities on the computing device to check for a change in active application. Embodiments may switch from one keyboard arrangement to another on detecting a change of active application.

CONCLUSION

Although the techniques have been described in language specific to structural features and/or methodological acts, it is to be understood that the appended claims are not necessarily limited to the specific features or acts described. Rather, the specific features and acts are disclosed as example implementations of such techniques.

What is claimed is:

1. A computer-implemented method comprising:
   detecting one or more gestures made by a user while using a first keyboard arrangement during a first session within a first environment, the first keyboard arrangement being a virtual keyboard arrangement that includes one or more elements that are customizable;

analyzing the one or more gestures to develop a statistical model based at least in part on a location of one or more gestures made by the user in association with a selection of one or more elements of the first keyboard arrangement;

based at least in part on the statistical model, determining a second keyboard arrangement that is customized with at least one or more altered elements for the user based at least in part on the statistical model, the second keyboard arrangement to minimize one or more potential errors made by the user in the selection of the one or more elements;

identifying the user in a second environment that is different from the first environment; and presenting the second keyboard arrangement during a second session subsequent to the first session within the second environment.

2. The method of claim 1 wherein the one or more elements are customizable in at least one of a size, a caption, a response profile, a location, or an orientation and wherein the second keyboard arrangement includes at least one alteration includes an alteration of at least one of the size, the caption, the response profile, the location, the caption, or the orientation of at least one of the one or more elements of the first keyboard arrangement.

3. The method of claim 1 wherein the analyzing of the one or more gestures is performed dynamically during the first session, and wherein the second keyboard arrangement is provided for the user during the first session within the first environment prior to presenting the second keyboard arrangement during the second session within the second environment.

4. The method of claim 1 wherein developing the statistical model further includes detecting a miss of at least one of the one or more elements by the user.

5. The method of claim 4 wherein detecting the miss is based at least in part on a subsequent gesture of the user indicating the miss.

6. The method of claim 4 wherein detecting the miss is based at least in part on a contextual analysis indicating at least one misspelling.

7. A computer-implemented method comprising:
presenting a keyboard arrangement in a first environment;
detecting one or more gestures made by a user while using the keyboard arrangement in the first environment, the one or more gestures includes at least a miss-event of at least one of the one or more elements of the keyboard arrangement;
analyzing the one or more gestures to develop a usage model based at least in part on the one or more gestures made by the user in association with selection of one or more elements of the keyboard arrangement;
based at least in part on the usage model, determining a modified keyboard arrangement that is different than the keyboard arrangement, the modified keyboard arrangement includes a change of one or more of a size, a label, a location, or an orientation of at least one of the one or more elements of the keyboard arrangement;
identifying the user in a second environment different than the first environment; and
presenting the modified keyboard arrangement in the second environment.

8. The method of claim 7 wherein the usage model is a statistical usage model.

9. The method of claim 7 wherein the modified keyboard arrangement is further projected by a projector onto a surface in the second environment.

10. The method of claim 7 wherein the modified keyboard arrangement further comprises altering a response profile for the keyboard arrangement without changing an appearance of the one or more elements of the keyboard arrangement.

11. The method of claim 7 wherein detecting the miss-event is based at least in part on at least one of:
a subsequent gesture of the user that is indicative of the miss-event; or
detecting an error in an entry made by the user based on a contextual analysis of the entry.

12. The method of claim 7 further comprising monitoring a position of at least one body part of the user, and wherein the modified keyboard arrangement includes changing a location of one or more portions of the keyboard arrangement to provide at least one ergonomic benefit for the user, further based at least in part on the monitored position.

13. A system comprising:
a memory;
at least one processor in communication with the memory;
a projector to project a first keyboard arrangement in a first environment;
a sensor data receiving component stored in the memory and executed by the at least one processor to receive data associated with one or more gestures made by a user while using the first keyboard arrangement in the first environment;
a keyboard modification component stored in the memory and executed by the at least one processor to:
analyze the one or more gestures to develop a statistical model based at least in part on a location of gestures made by the user in association with selection of one or more elements of the first keyboard arrangement during a first session; and
create a second keyboard arrangement different from the first keyboard arrangement, the second keyboard arrangement is customized with at least one or more altered elements based at least in part on the statistical model to minimize one or more potential errors in the selection of the one or more elements;
a keyboard storage component stored in the memory and executed by the at least one processor to store the second keyboard arrangement for the user;
a user identification component stored in the memory and executed by the at least one processor to identify the user in a second environment during a second session subsequent to the first session; and
a keyboard rendering component stored in the memory and executed by the at least one processor to provide the second keyboard arrangement in response to the identification of the user.

14. The system of claim 13 wherein second keyboard arrangement is further created based at least in part on an application in use by the user.

15. The system of claim 13 wherein the second keyboard arrangement is further created based at least in part on a current application context of an application in use by the user.

16. The system of claim 13 wherein the user identification component identifies the user by at least facial recognition.

17. The system of claim 13 wherein the analyzing of the one or more gestures is performed dynamically during a session, and wherein the second keyboard arrangement is provided for use by the user during the session in the first environment.

18. One or more computer-readable storage media storing instructions that, when executed, instruct at least one processor to perform actions comprising:
- presenting a first image of a first keyboard arrangement at a first time in a first environment;
- detecting one or more gestures made by a user interacting with the first image of the first keyboard arrangement in the first environment;
- analyzing the one or more gestures to develop a statistical model based at least in part on a location of the one or more gestures made by the user in association with a selection of one or more elements of the first keyboard arrangement;
- creating a second keyboard arrangement different than the first keyboard arrangement, the second keyboard arrangement is customized with at least one or more altered elements based at least in part on the statistical model to minimize one or more potential errors in the selection of the one or more elements;
- storing the second keyboard arrangement in association with the user;
- identifying the user in a second environment at a second time subsequent the first time; and
- presenting a second image of the second keyboard arrangement in the second environment.

19. The one or more computer-readable storage media of claim 18 wherein the actions further comprise:
- identifying the user in the second environment by at least facial recognition; and
- presenting the second keyboard arrangement for the user based at least in part on the identification.

20. The one or more computer-readable storage media of claim 18 wherein identifying the user is based at least in part on recognizing at least one of a hand position or a hand gesture of the user.

21. The one or more computer-readable storage media of claim 18 wherein the actions further comprise presenting the second keyboard arrangement onto a surface in the second environment.

22. The one or more computer-readable storage media of claim 18 wherein providing the first image of the first keyboard arrangement or the second image of the second keyboard arrangement as an abstract representation away from a physical object in a space that is proximal to the user.

23. The one or more computer-readable storage media of claim 18 wherein the second keyboard arrangement is created by altering at least one of the one or more elements of the first keyboard arrangement, the altering includes altering one or more of a size, a caption, a location, or an orientation of the at least one of the one or more elements of the first keyboard arrangement.

24. The one or more computer-readable storage media of claim 18 wherein detecting the one or more gestures includes tracking one or more motions of one or more fingers of the user to perform the one or more gestures.

25. The method of claim 1 wherein the second keyboard arrangement is presented as an abstract arrangement within the second environment in a space proximal to the user located in the second environment.

26. The method of claim 1 wherein the identifying the user comprises identifying the user using at least facial recognition.

27. The system of claim 13 wherein the first environment is a first room in a house and the second environment is a second room in the house.

* * * * *